US012122161B2

(12) United States Patent
Osakabe

(10) Patent No.: US 12,122,161 B2
(45) Date of Patent: Oct. 22, 2024

(54) INKJET PRINTER

(71) Applicant: Brother Kogyo Kabushiki Kaisha, Nagoya (JP)

(72) Inventor: Yoshinori Osakabe, Seto (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 130 days.

(21) Appl. No.: 17/817,679

(22) Filed: Aug. 5, 2022

(65) Prior Publication Data

US 2022/0371323 A1 Nov. 24, 2022

Related U.S. Application Data

(63) Continuation-in-part of application No. PCT/JP2021/005649, filed on Feb. 16, 2021.

(30) Foreign Application Priority Data

Feb. 20, 2020 (CN) ........................ 202020189854.X
Feb. 20, 2020 (CN) ........................ 202020192259.1
Feb. 20, 2020 (CN) ........................ 202020215039.6

(51) Int. Cl.
*B41J 2/14* (2006.01)
*B41J 25/00* (2006.01)

(52) U.S. Cl.
CPC ........... *B41J 2/1433* (2013.01); *B41J 25/006* (2013.01); *B41J 2002/14491* (2013.01)

(58) Field of Classification Search
CPC .................... B41J 2/1433; B41J 25/006; B41J 2002/14491; B41J 25/304; B41J 25/308;
(Continued)

(56) References Cited

U.S. PATENT DOCUMENTS 4,593,294 A 6/1986 Parisi
2002/0191046 A1* 12/2002 Otsuki ................ B41J 2/17509 347/85

(Continued)

FOREIGN PATENT DOCUMENTS

JP H01-221251 A 9/1989
JP H06-305161 A 11/1994

(Continued)

OTHER PUBLICATIONS

International Search Report (with English translation) and Written Opinion, International Application No. PCT/JP2021/005649, dated May 18, 2021 (10 pages).

(Continued)

*Primary Examiner* — Jason S Uhlenhake
(74) *Attorney, Agent, or Firm* — Element IP, PLC

(57) ABSTRACT

An inkjet printer includes a support member configured to support a recording medium moving in a first direction, a carriage configured to reciprocate in a second direction orthogonal to the first direction and provided with a first electrical contact and a second electrical contact, a first recording head mounted on the carriage so as to contact the first electrical contact and configured to reciprocate together with the carriage, and an electrical contact protection member mounted on the carriage so as to contact the second electrical contact and configured to reciprocate together with the carriage. A shortest distance between the electrical contact protection member mounted on the carriage and the support member in a third direction is greater than a shortest distance between the first recording head mounted on the carriage and the support member in the third direction, the third direction being orthogonal to the first and second directions.

5 Claims, 16 Drawing Sheets

C-C

(58) Field of Classification Search
CPC ................ B41J 25/3082; B41J 25/3084; B41J 25/3086; B41J 25/3088
See application file for complete search history.

(56) References Cited

U.S. PATENT DOCUMENTS

| | | | | |
|---|---|---|---|---|
| 2016/0097697 | A1* | 4/2016 | Kawanishi | B41J 2/175 73/40.5 R |
| 2018/0290455 | A1 | 10/2018 | Tanaka et al. | |
| 2020/0316969 | A1* | 10/2020 | Tanaka | B41J 2/16517 |

FOREIGN PATENT DOCUMENTS

| | | | |
|---|---|---|---|
| JP | 2002-292904 | A | 10/2002 |
| JP | 2005-081689 | A | 3/2005 |
| JP | 2017-087575 | A | 5/2017 |
| JP | 2018-176503 | A | 11/2018 |
| WO | 2020/045218 | A1 | 3/2020 |

OTHER PUBLICATIONS

English translation of the International Preliminary Report on Patentability (Chapter I) dated Aug. 23, 2022 (Application No. PCT/JP2021/005649).

* cited by examiner

INKJET PRINTER

REFERENCE TO RELATED APPLICATIONS

This is a Continuation-in-Part of International Application No. PCT/JP2021/005649 filed on Feb. 16, 2021, which claims priority from Chinese Utility Model Application No. 202020192259.1 filed on Feb. 20, 2020, Chinese Utility Model Application No. 202020215039.6 filed on Feb. 20, 2020, and Chinese Utility Model Application No. 202020189854 filed on Feb. 20, 2020. The entire disclosures of the prior applications are incorporated herein by reference.

BACKGROUND ART

Aspects of the present disclosure relate to a technical field of printing apparatuses, and more specifically to inkjet printers.

Inkjet printers generally perform image recording by ejecting ink from a recording head toward a recording medium (e.g., recording paper).

As illustrated in FIG. 1, a conventional inkjet printer 1 includes a printer main body 10. In the printer main body 10, two guide members which are separated from each other and parallel to each other are provided, and a carriage is provided on the two guide members. The carriage is movable relative to the two guide members. The carriage may be provided with a recording head 6 to which ink can be replenished many times, and the recording head 6 is able to reciprocate along the carriage. The recording head 6 ejects ink toward a recording medium (for example, a sheet) and records an image (e.g., characters, codes, figures, etc.) on the recording medium.

The printer main body 10 is usually provided with a sheet feeding device, and the sheet is moved in a first direction D1 by using a driving device. The sheet on which an image is to be recorded is disposed in the printer main body 10 and is supported by a support member. The recording head 6 reciprocates along the carriage in a second direction D2 perpendicular to the first direction D1.

On the other hand, the recording head 6 may include a monochrome recording head in which black ink is to be stored and, in this case, normally, a black ink tank storing black ink to be supplied to the monochrome recording head through a supply pipe is provided in the printer main body 10. In this case, the inkjet printer is used as a monochrome printer.

The monochrome recording head is usually provided with an electrical contact, and a first electrical contact configured to contact the electrical contact of the monochrome recording head is provided to the carriage. When the monochrome recording head is mounted on the carriage, the electrical contact of the monochrome recording head comes into contact with the first electrical contact, whereby a control module of the inkjet printer 1 can identify that the monochrome recording head has been mounted on the carriage, and thus the monochrome recording head can be used normally.

On the other hand, the recording head 6 can include a color recording head in which color ink is to be stored. The color recording head can discharge, for example, ink of three colors, namely cyan, magenta and yellow. When the above-described monochrome recording head and the color recording head are both mounted on the carriage, the inkjet printer 1 can discharge ink of the above-described three colors and black and thus can be used as a color printer capable of recording color images. The color recording head is usually provided with an electrical contact, and the carriage is provided with a second electrical contact. The second electrical contact comes into contact with the electrical contact of the color recording head when the color recording head is mounted on the carriage, whereby the control module of the inkjet printer 1 can identify that the color recording head has been mounted on the carriage, and thus the color recording head can be used normally.

When using the above-described inkjet printer 1 as a monochrome printer, the monochrome recording head is mounted on the carriage, but the color recording head is not mounted on the carriage. In this state, the second electrical contact on the carriage is exposed. Long-time exposure of the second electrical contact may cause corrosion due to adhesion of foreign matter or influence of ink mist. Therefore, usually, a protection member for protecting the second electrical contact is provided.

DESCRIPTION

However, one end of the conventional protection member facing the support member is usually formed with an annular rib surrounding a space, and a nozzle surface of the monochrome recording head for discharging ink is usually on the same plane as the one end of the protection member facing the support member.

That is, a shortest distance from the monochrome recording head to the support member along a third direction D3 orthogonal to the first direction D1 and the second direction D2 is equal to a shortest distance from the color recording head to the support member along the third direction.

With this configuration, when the carriage reciprocates together with the monochrome recording head and the protection member, the sheet on which ink has been ejected may curve, and the rib at one end of the protection member facing the support member may rub against the curved sheet, resulting in sheet jam. In addition, the nozzle surface of the monochrome recording head may be scraped or rubbed by the curved sheet, resulting in damage to the nozzle surface.

Accordingly, it is necessary to provide an inkjet printer that solves at least some of the above-described problems.

According to aspects of the present disclosure, there is provided an inkjet printer including a support member configured to support a recording medium moving in a first direction, a carriage configured to reciprocate in a second direction orthogonal to the first direction and provided with a first electrical contact and a second electrical contact, a first recording head mounted on the carriage so as to contact the first electrical contact and configured to reciprocate together with the carriage, and an electrical contact protection member mounted on the carriage so as to contact the second electrical contact and configured to reciprocate together with the carriage. A shortest distance between the electrical contact protection member mounted on the carriage and the support member in a third direction is greater than a shortest distance between the first recording head mounted on the carriage and the support member in the third direction. The third direction is orthogonal to the first direction and the second direction.

According to the above-described inkjet printer, the shortest distance between the electrical contact protection member mounted on the carriage and the support member in the third direction is greater than the shortest distance between the electrical contact protection member mounted on the carriage and the support member in the third direction. That is, the electrical contact protection member is further away from the support member than the first recording head in the third direction. Accordingly, the occurrence of sheet jam can be effectively reduced.

According to aspects of the present disclosure, there is further provided an inkjet printer including a support member configured to support a recording medium moving in a first direction, a carriage configured to reciprocate in a second direction orthogonal to the first direction and provided with a first electrical contact and a second electrical contact, a first recording head mounted on the carriage so as to contact the first electrical contact and configured to reciprocate together with the carriage, and an electrical contact protection member mounted on the carriage so as to contact the second electrical contact and configured to reciprocate together with the carriage. A shortest distance between the electrical contact protection member mounted on the carriage and the support member in a third direction is shorter than a shortest distance between the first recording head mounted on the carriage and the support member in the third direction. The third direction is orthogonal to the first direction and the second direction.

According to the above-described inkjet printer, the shortest distance between the electrical contact protection member mounted on the carriage and the support member in the third direction is smaller than the shortest distance between the electrical contact protection member mounted on the carriage and the support member in the third direction. That is, the electrical contact protection member is closer to the support member in the third direction than the first recording head. Accordingly, it is possible to reduce the possibility that the nozzle surface of the first recording head 104 is easily damaged by being scraped or rubbed by a curved sheet, and thus it is possible to protect the nozzle surface.

According to aspects of the present disclosure, there is further provided an inkjet printer including a support member configured to support a recording medium moving in a first direction, a carriage configured to reciprocate in a second direction orthogonal to the first direction and provided with a first electrical contact and a second electrical contact, a first recording head mounted on the carriage so as to contact the first electrical contact and configured to reciprocate together with the carriage, and an electrical contact protection member mounted on the carriage so as to contact the second electrical contact and configured to reciprocate together with the carriage. The electrical contact protection member includes a first surface having a protection contact in contact with the second electrical contact when the electrical contact protection member is mounted on the carriage, and a sheet jam prevention mechanism provided along the second direction to form a second surface connected to the first surface and facing the support member when the electrical contact protection member is mounted on the carriage. The sheet jam prevention mechanism includes one of at least three convex ribs provided at intervals in the second direction, two convex ribs provided at an interval in the second direction, the interval being equal to or less than a size of one of the two convex ribs in the second direction, and a member being continuous in the second direction.

According to the above-described inkjet printer, the electrical contact protection member is provided with a sheet jam prevention mechanism which is provided along the second direction and forms a second surface that faces the support member and is connected to the first surface. Since the sheet jam prevention mechanism is provided with any one of the three types of structures described above, the occurrence of sheet jam while the carriage reciprocates in the second direction can be reduced.

Figure 3:
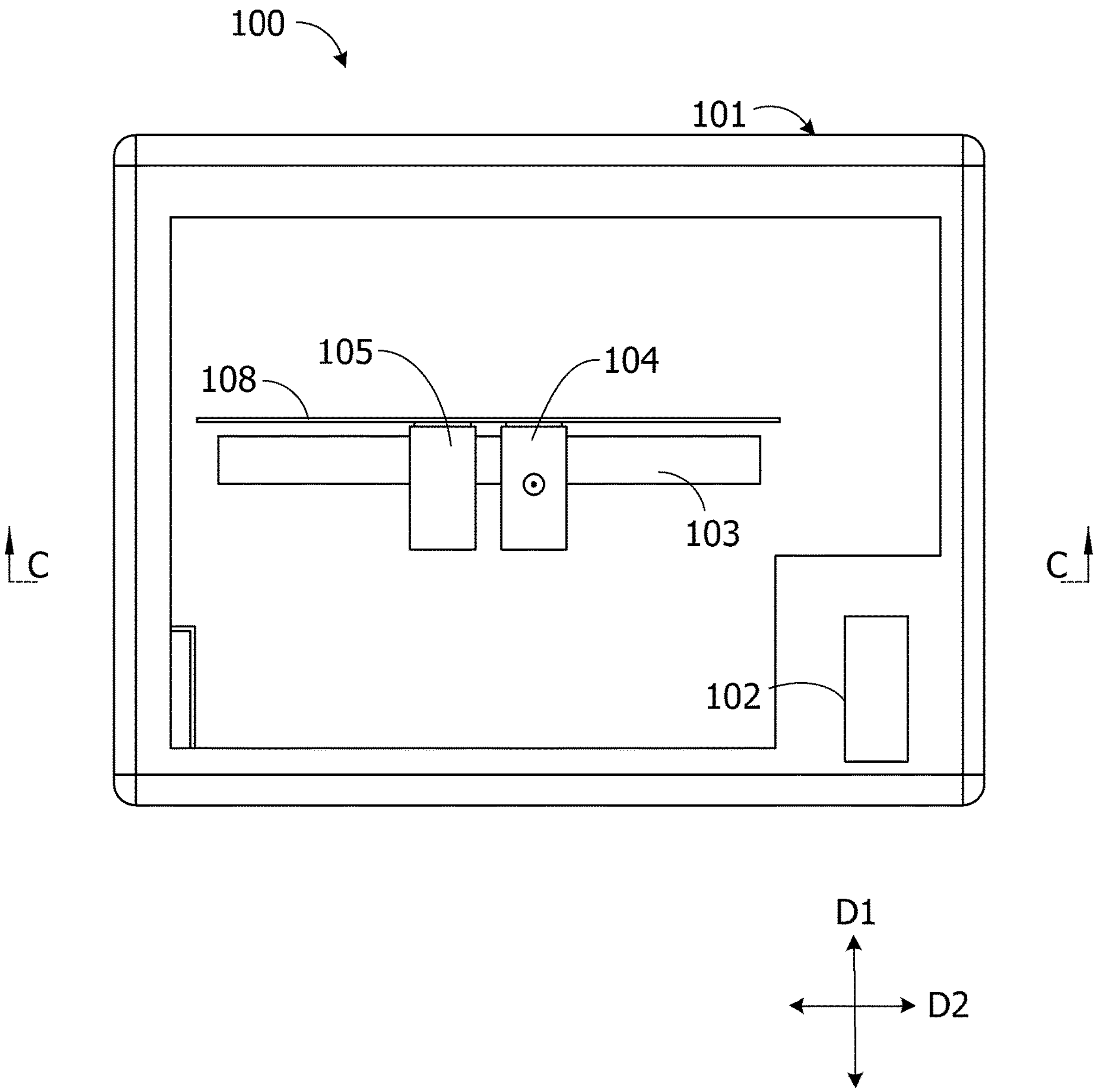
FIG. 3 is a plan view of the inkjet printer according to the first embodiment of the present disclosure after the top cover is opened.
Figure 4:
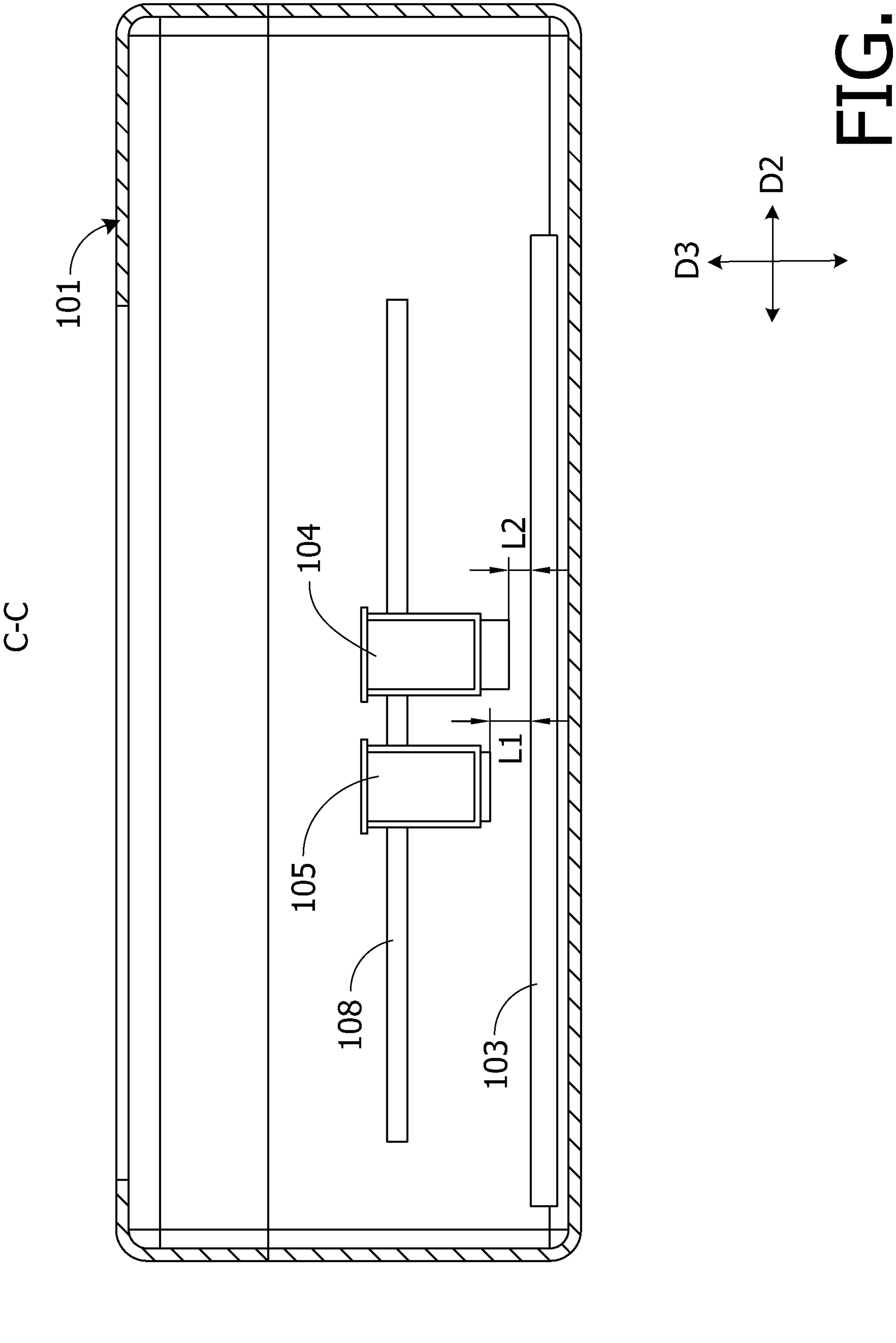

FIG. 4 is a cross-sectional view of the inkjet printer according to the first embodiment of the present disclosure taken along a line C-C in FIG. 3, showing a shortest distance between an electrical contact protection member mounted on the carriage and a supporting member along a third direction and a shortest distance between a first recording head mounted on the carriage and the supporting member along the third direction.

Figure 5:
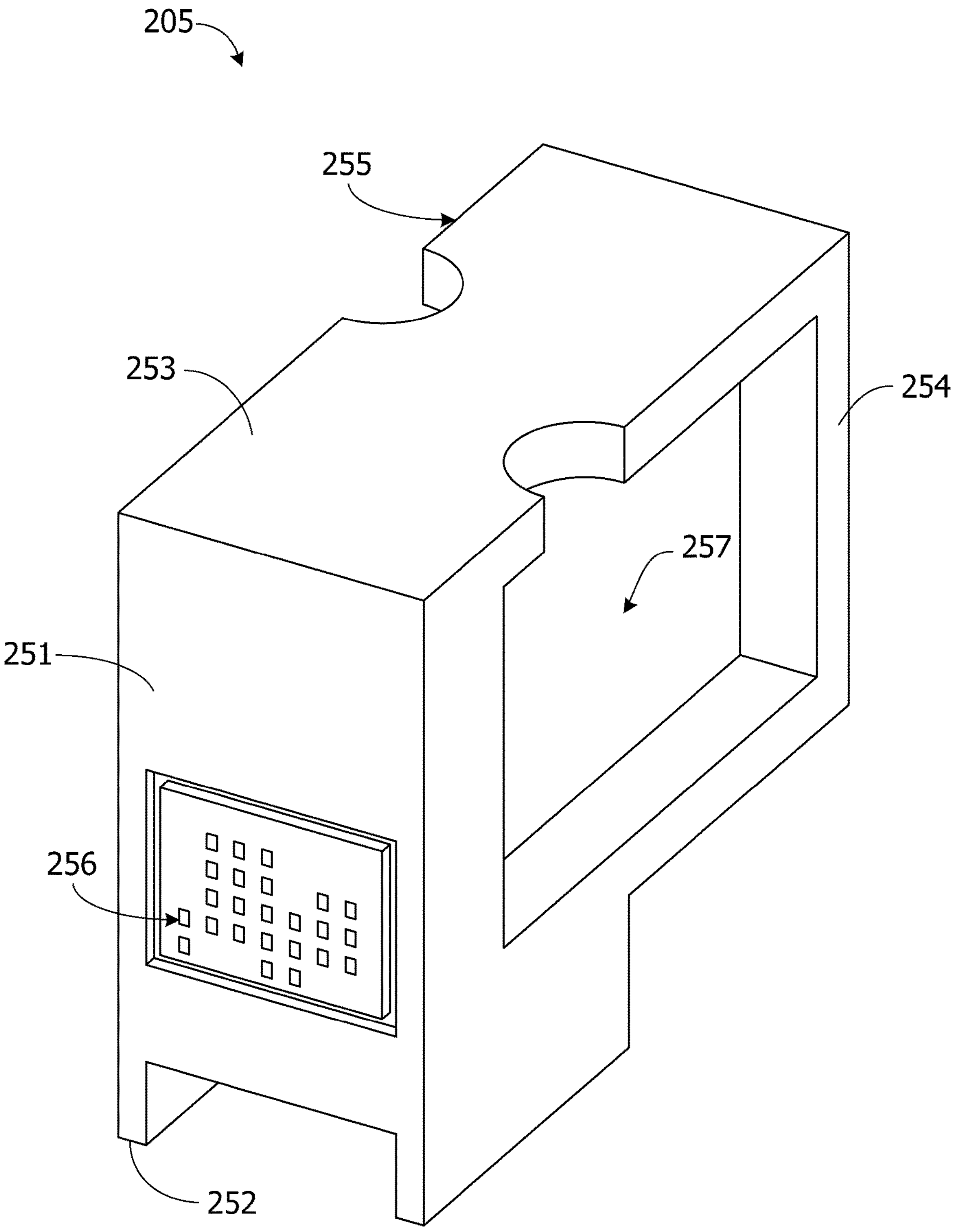

FIG. 5 is a perspective view of an electrical contact protection member in an inkjet printer according to a second embodiment of the present disclosure.

Figure 6:
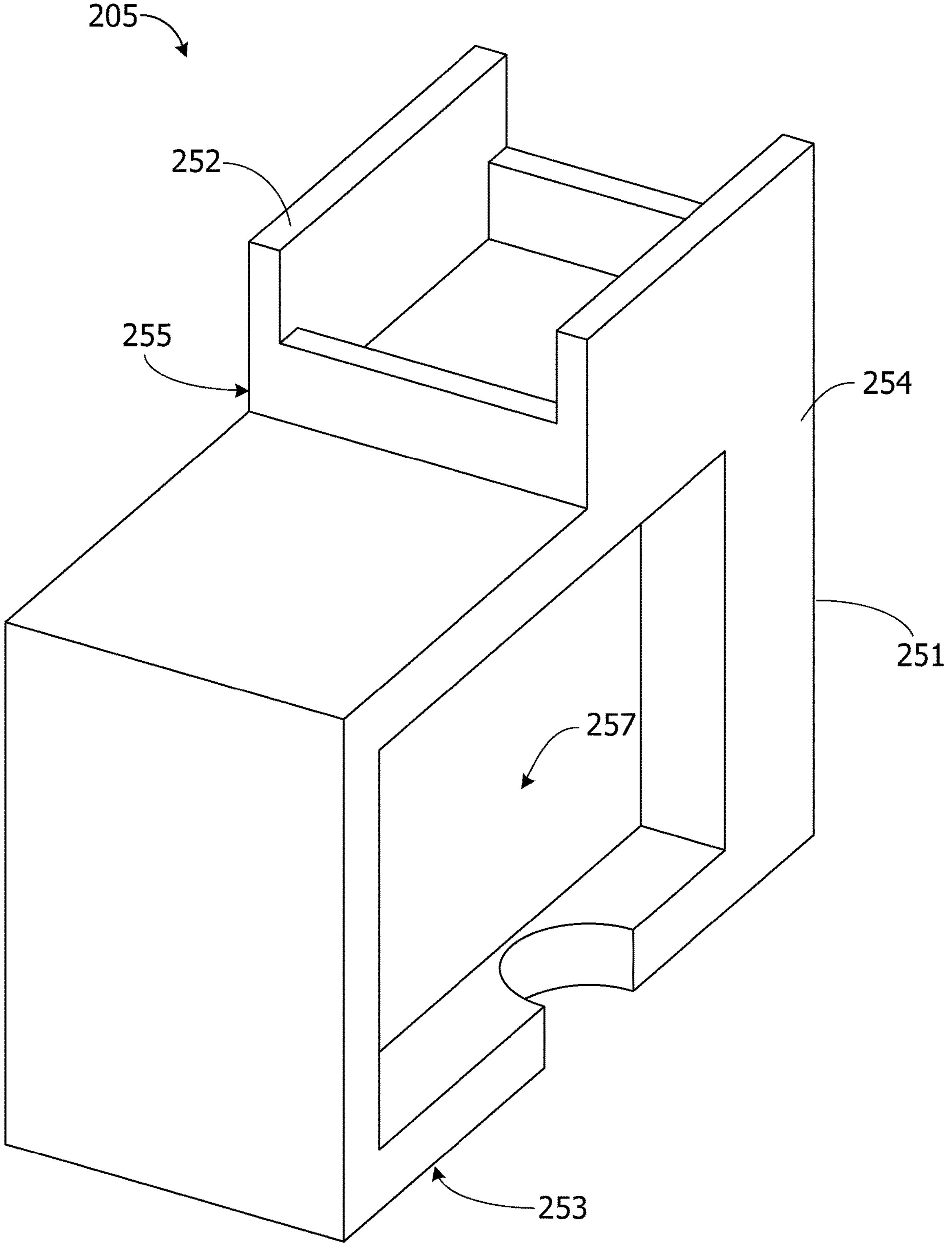

FIG. 6 is a perspective view of the electrical contact protection member shown in FIG. 5 as viewed from another angle.

Figure 7:
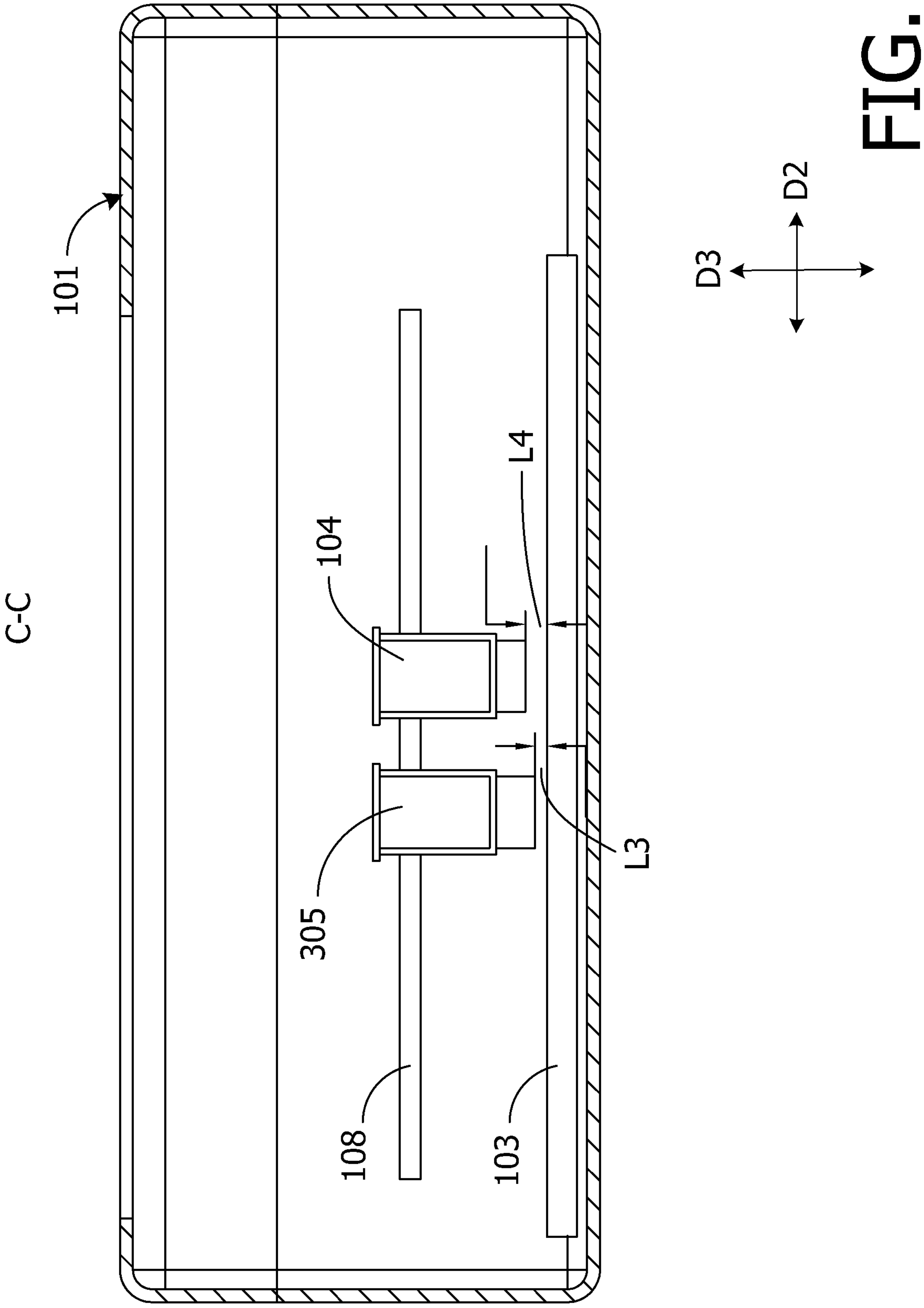

FIG. 7 is a cross-sectional view of an inkjet printer according to a third embodiment of the present disclosure taken along the line C-C in FIG. 3, showing a shortest distance between an electrical contact protection member mounted on the carriage and the support member along the third direction and a shortest distance between the first recording head mounted on the carriage to the support member along the third direction.

Figure 8:
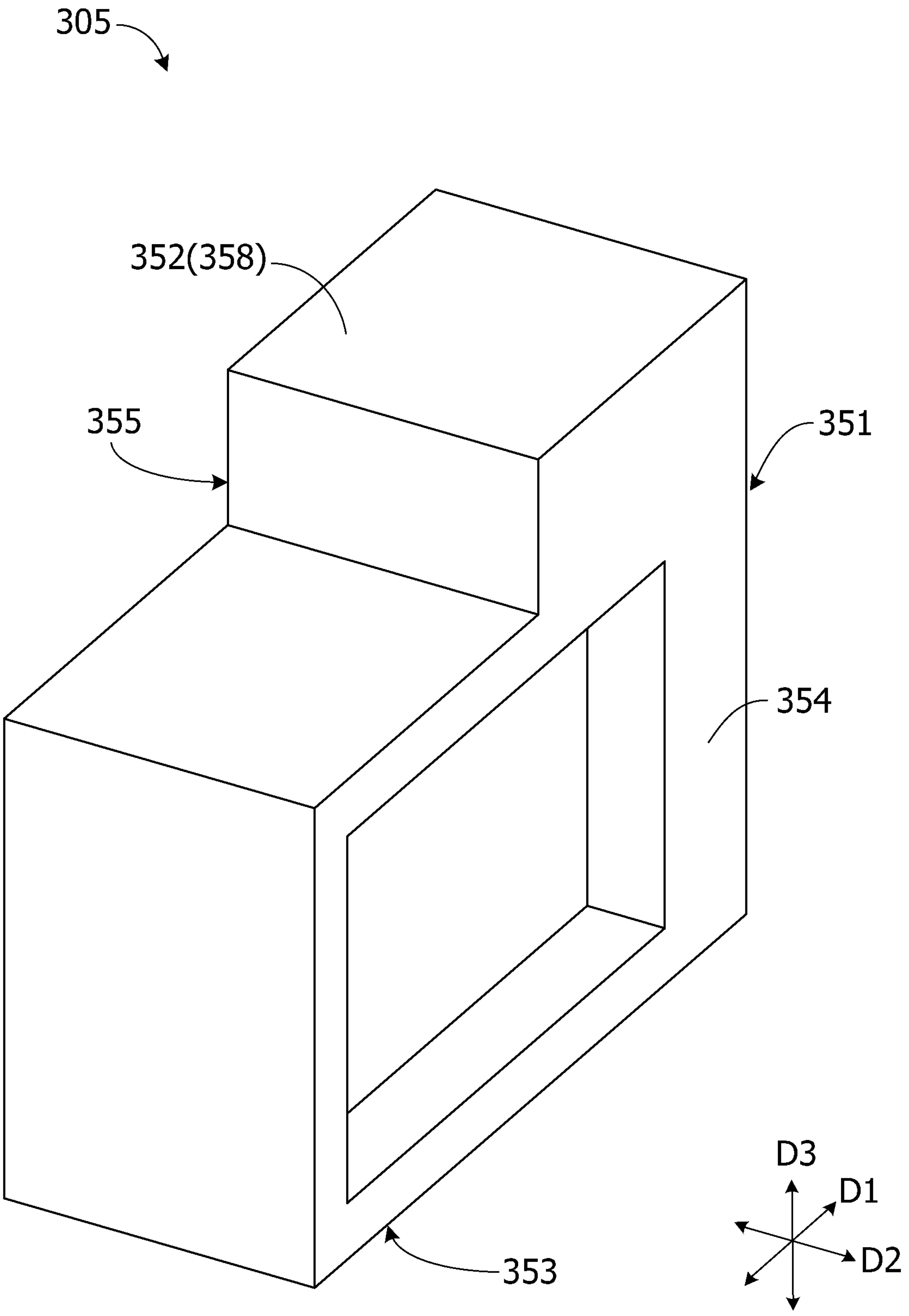

FIG. 8 is a perspective view of the electrical contact protection member in the inkjet printer according to the third embodiment of the present disclosure.

Figure 9:
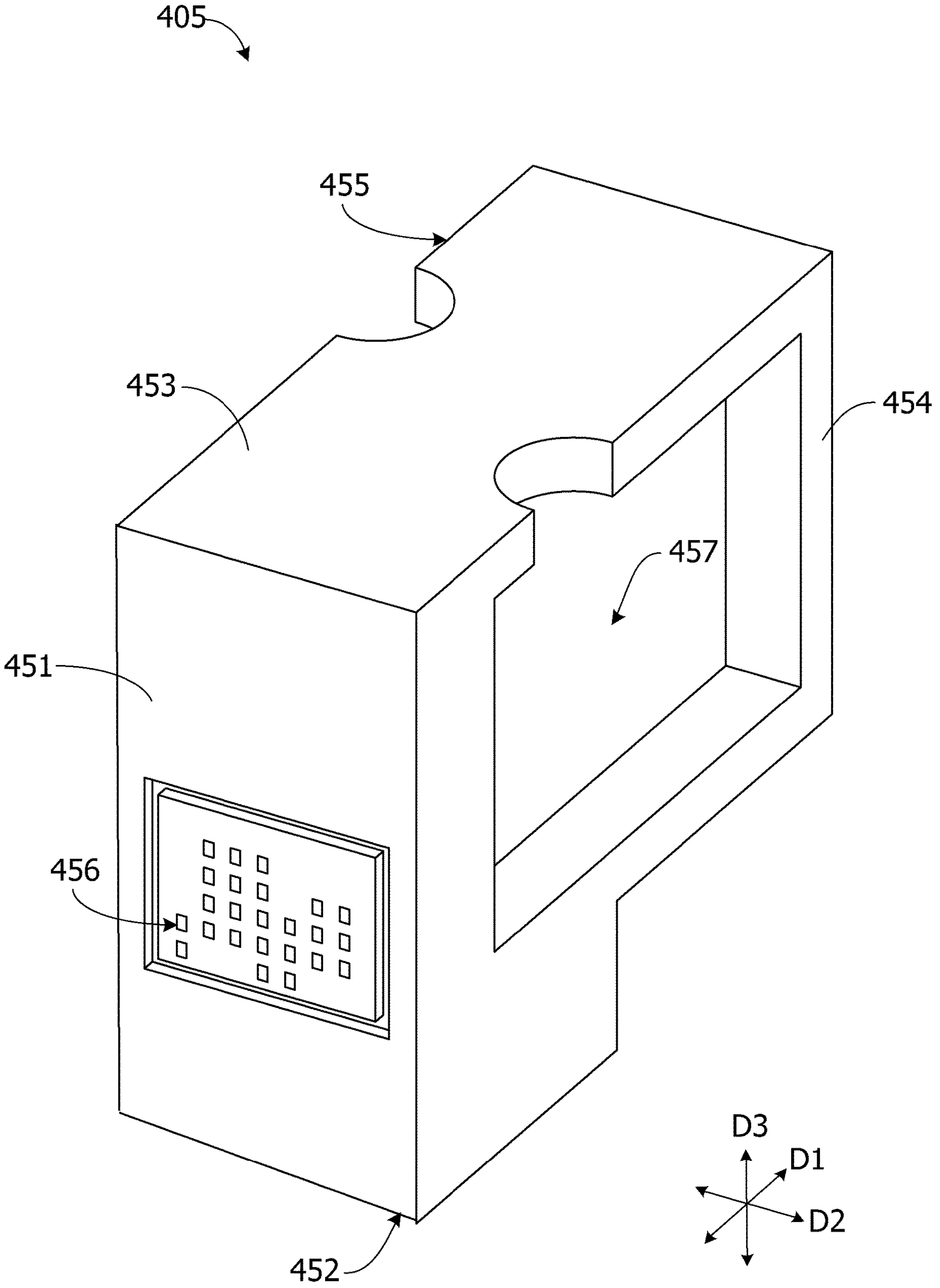

FIG. 9 is a perspective view of an electrical contact protection member in an inkjet printer according to a fourth embodiment of the present disclosure.

Figure 10:
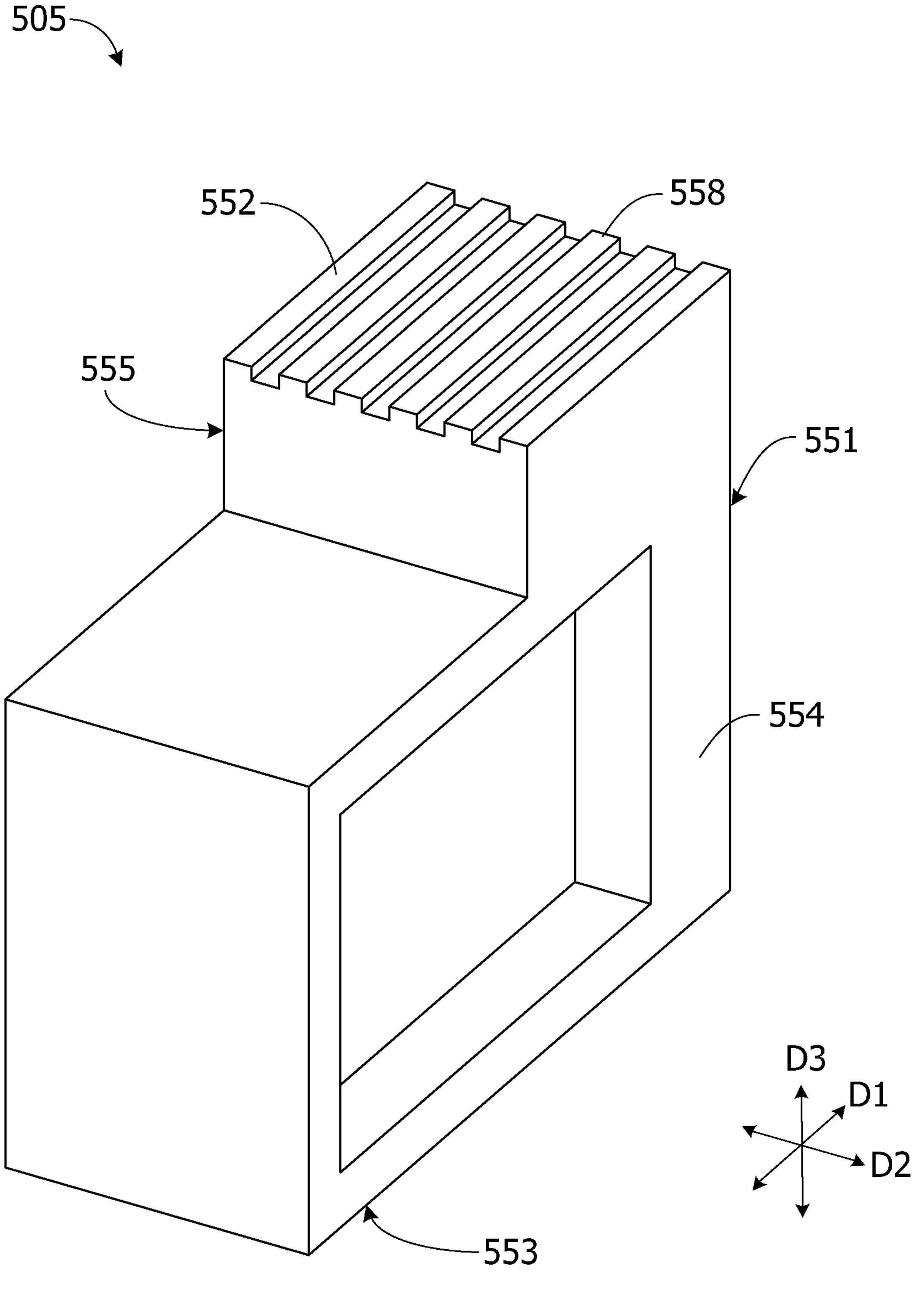

FIG. 10 is a perspective view of an electrical contact protection member in an inkjet printer according to a fifth embodiment of the present disclosure.

Figure 11:
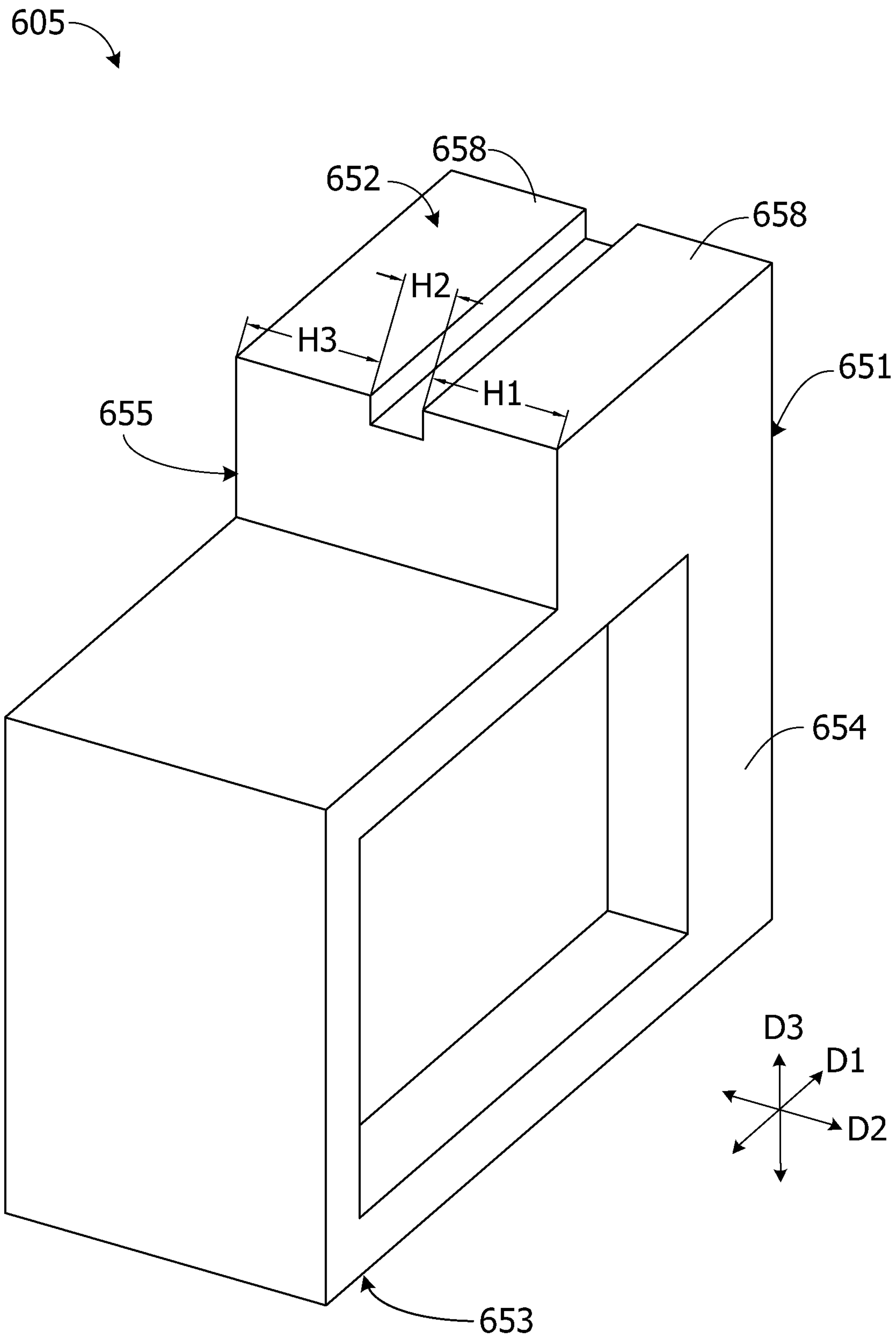

FIG. 11 is a perspective view of an electrical contact protection member in an inkjet printer according to a sixth embodiment of the present disclosure.

Figure 12:
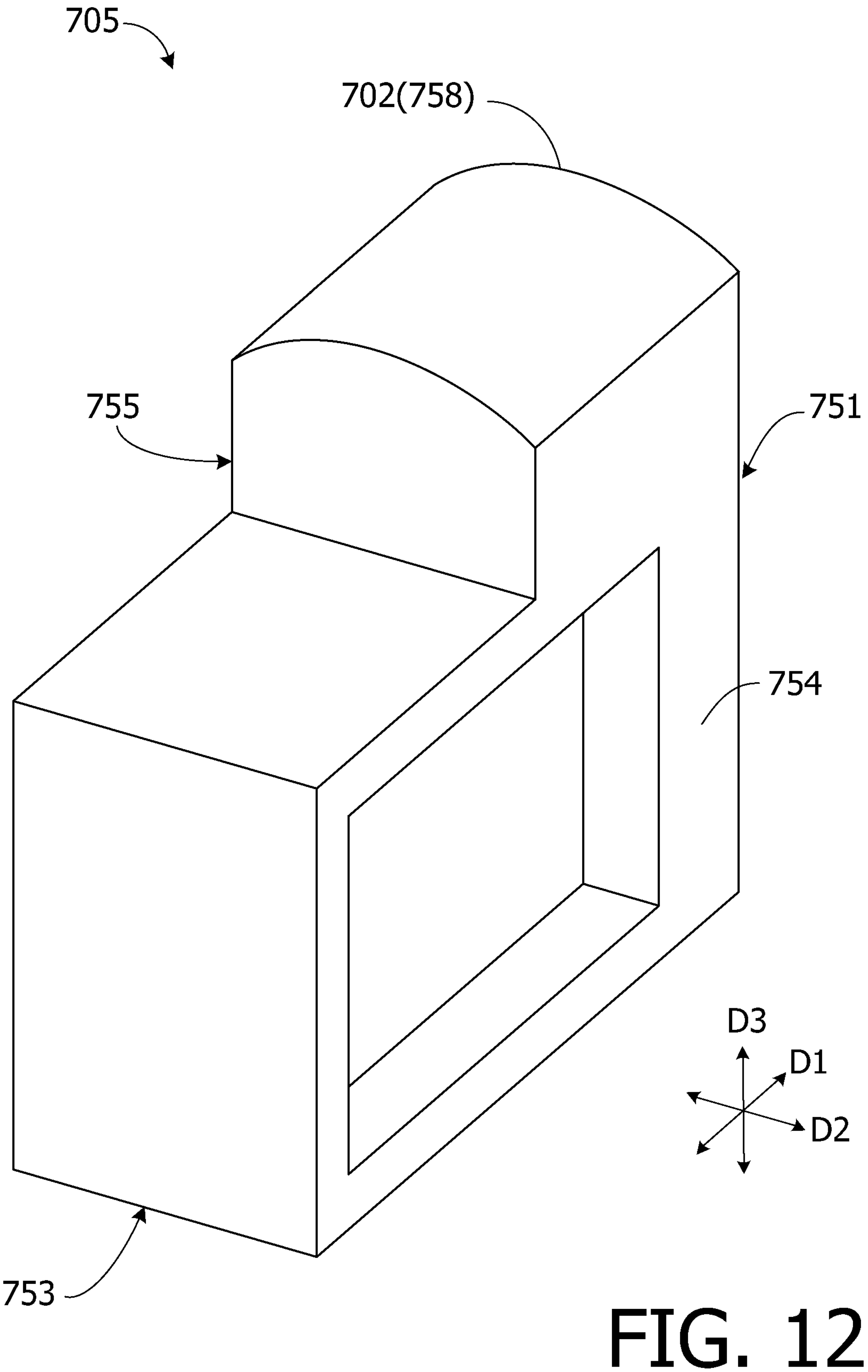

FIG. 12 is a perspective view of an electrical contact protection member in an inkjet printer according to a seventh embodiment of the present disclosure.

Figure 13:
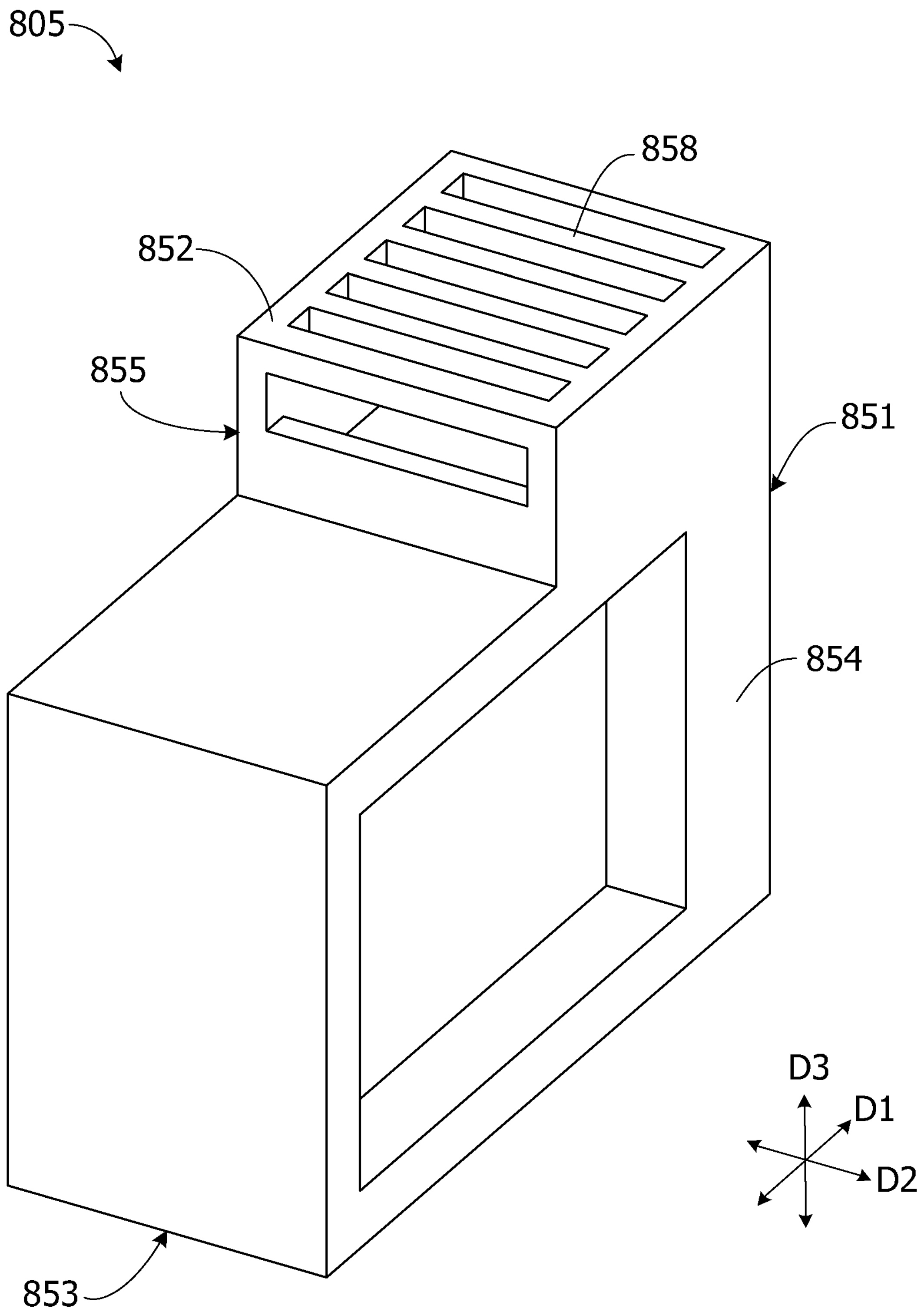

FIG. 13 is a perspective view of an electrical contact protection member in an inkjet printer according to an eighth embodiment of the present disclosure.

Figure 14:
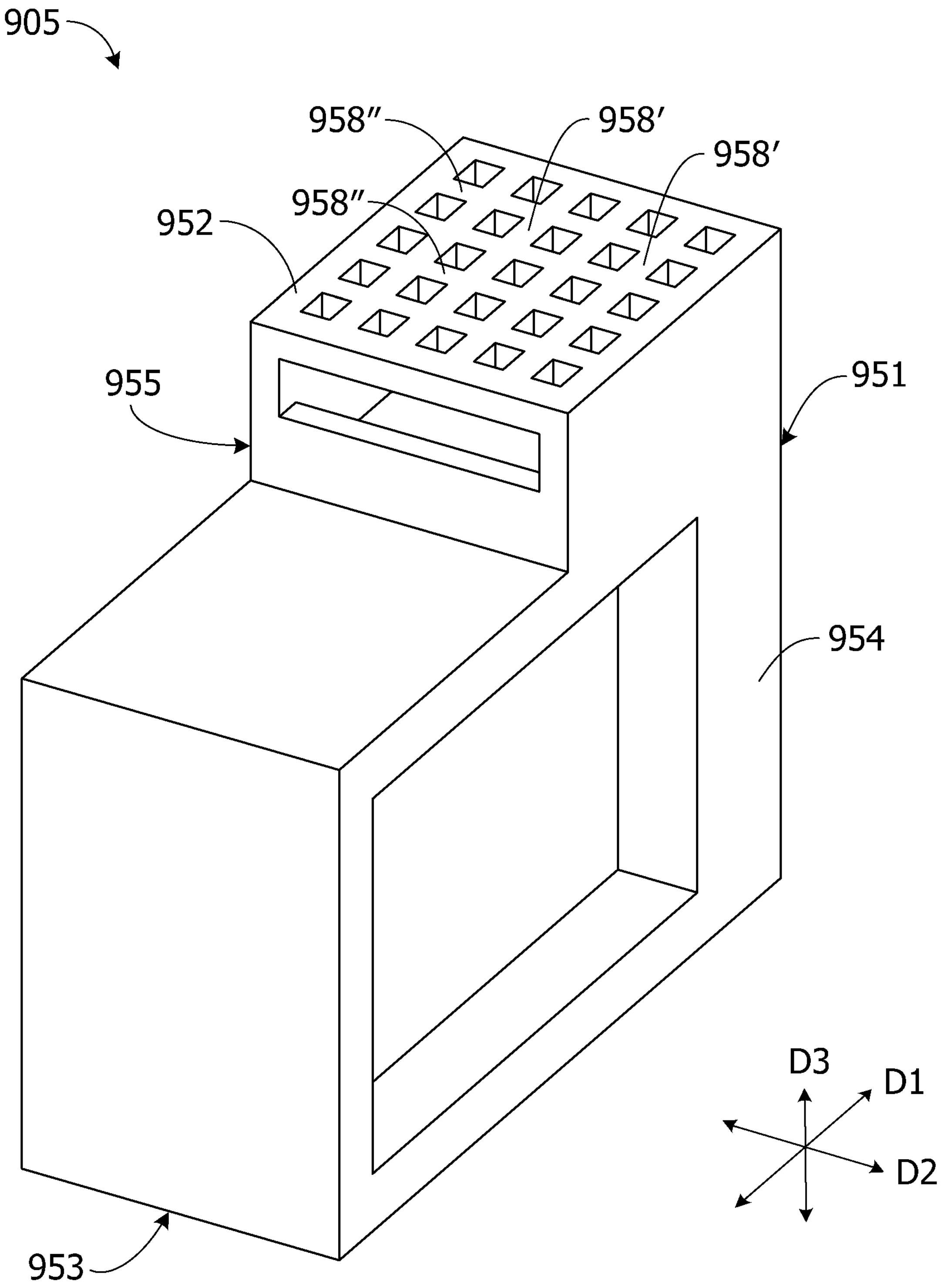

FIG. 14 is a perspective view of an electrical contact protection member in an inkjet printer according to a ninth embodiment of the present disclosure.

Figure 15:
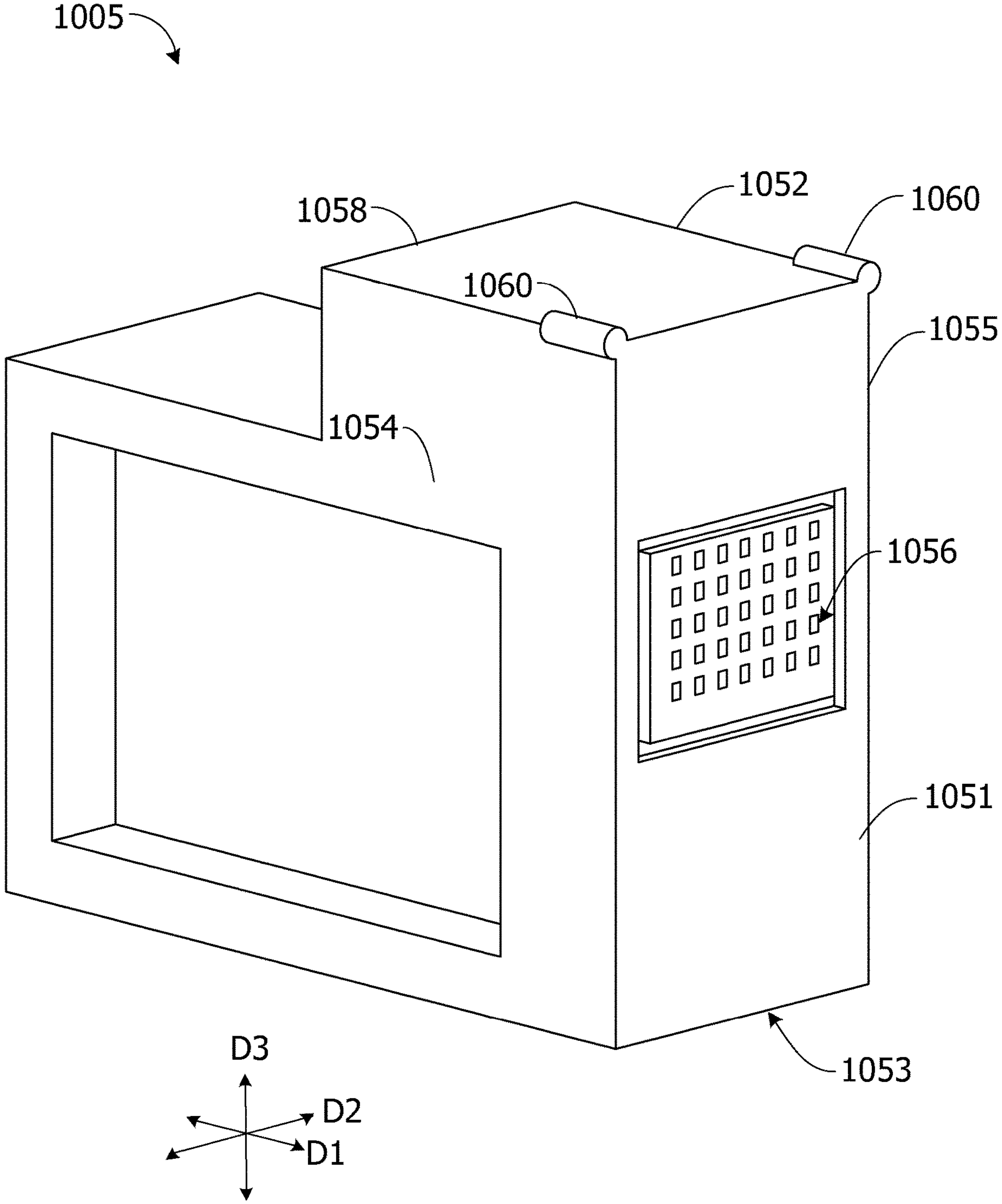

FIG. 15 is a perspective view of an electrical contact protection member in an inkjet printer according to a tenth embodiment of the present disclosure.

Figure 16:
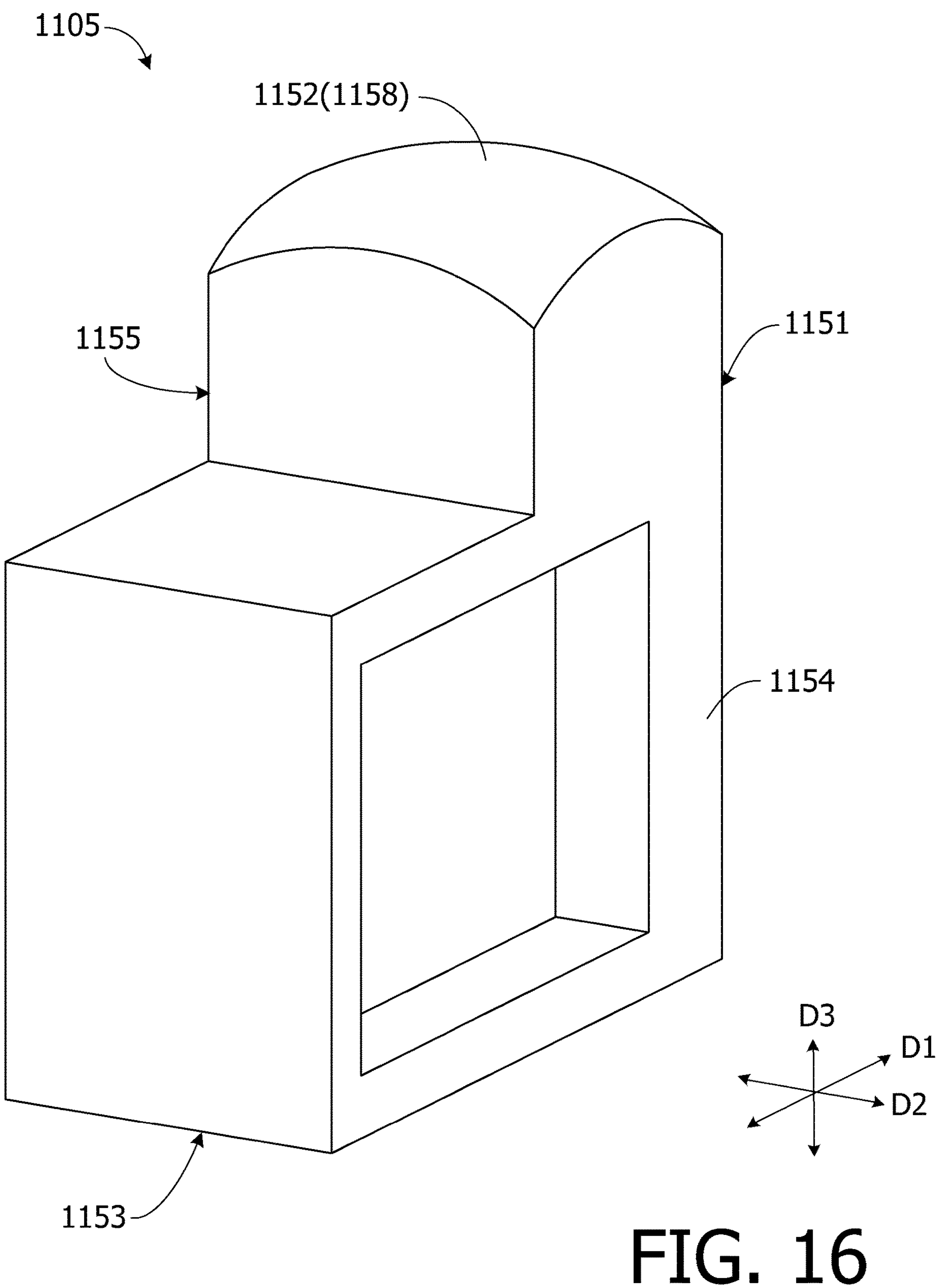

FIG. 16 is a perspective view of an electrical contact protection member in an inkjet printer according to an eleventh embodiment of the present disclosure.

In the following description, numerous specific details are set forth in order to provide a thorough understanding of aspects of the present disclosure. However, description of matters apparent to those skilled in the art and well-known technical features in the art are omitted to avoid confusion with embodiments of the present disclosure.

Hereinafter, embodiments of the present disclosure will be described with reference to the drawings. In the following description, the terms "upper," "lower," or similar terms are used. However, such terms are not intended to limit aspects of the present disclosure.

In the following description, ordinal numbers such as "first" and "second" used in the present application are merely labels, and thus do not imply that there is no other structure and do not represent a specific order or the like. Moreover, for example, the expression "first member" does not imply the presence of a "second member," and the expression "second member" does not imply the presence of a "first member."

Hereinafter, inkjet printers according to the present disclosure will be described. The inkjet printers may have various functions such as an image scanning function, a facsimile function, and a copy function in addition to a printing function, and may have a double-sided image recording function of recording an image on both sides of a recording sheet as the printer function.

First Embodiment

Figure 1:
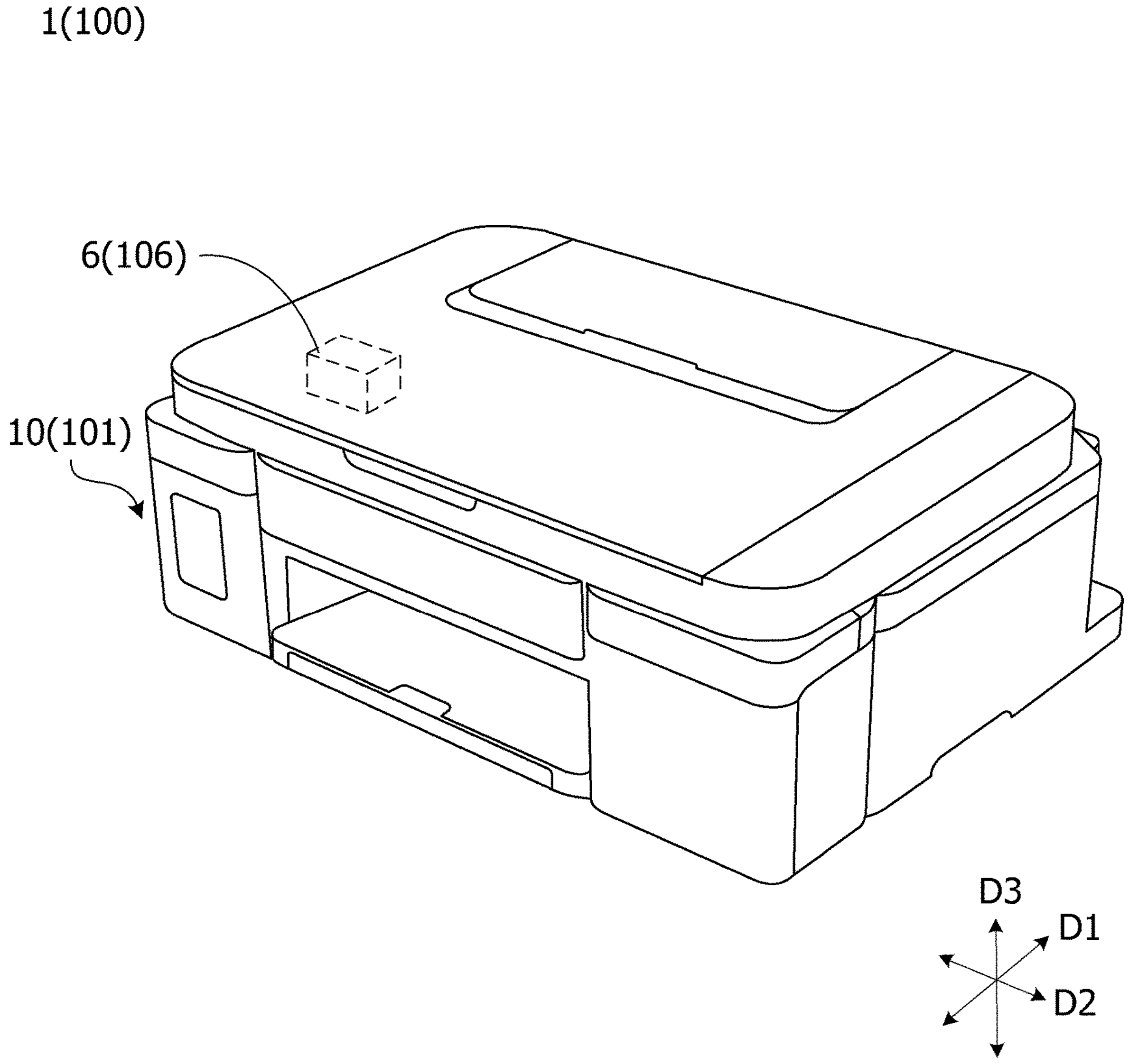
FIG. 1 is a perspective view of a conventional inkjet printer and an inkjet printer according to a first embodiment of the present disclosure.

FIG. 1 shows an inkjet printer 100 according to a first embodiment of the present disclosure. As shown in FIG. 1, the inkjet printer 100 includes a printer main body 101. The printer main body 101 has a substantially rectangular parallelepiped shape. A conventionally-known operation panel is provided on an upper surface of the printer main body 101. The operation panel includes a display that displays various types of information and setting contents, and operation keys for performing various operations and inputting setting contents. It should be noted that the inkjet printer 100 may not be provided with the display and may only be provided with the operation keys, and the operation keys may be provided at any appropriate position on the printer main body 101.

The printer main body 101 is provided with a feeding tray for feeding a recording medium (for example, a sheet) and a discharge tray used for discharging the recording medium. The printer main body 101 is normally provided with a conventionally-known sheet feeding device.

In the present embodiment, the sheet feeding device moves a sheet in a traveling direction along a first direction D1 shown in FIG. 1. The sheet moving in the first direction D1 is supported by a support member 103 provided in the printer main body 101.

In the printer main body 101, two conventionally-known guide members that are parallel to each other and spaced apart from each other are provided. A carriage 108 is provided on the two guide members, and the carriage 108 is movable along the two guide members. In the present embodiment, the carriage 108 is able to reciprocate along a second direction D2 orthogonal to the first direction D1.

Figure 2:
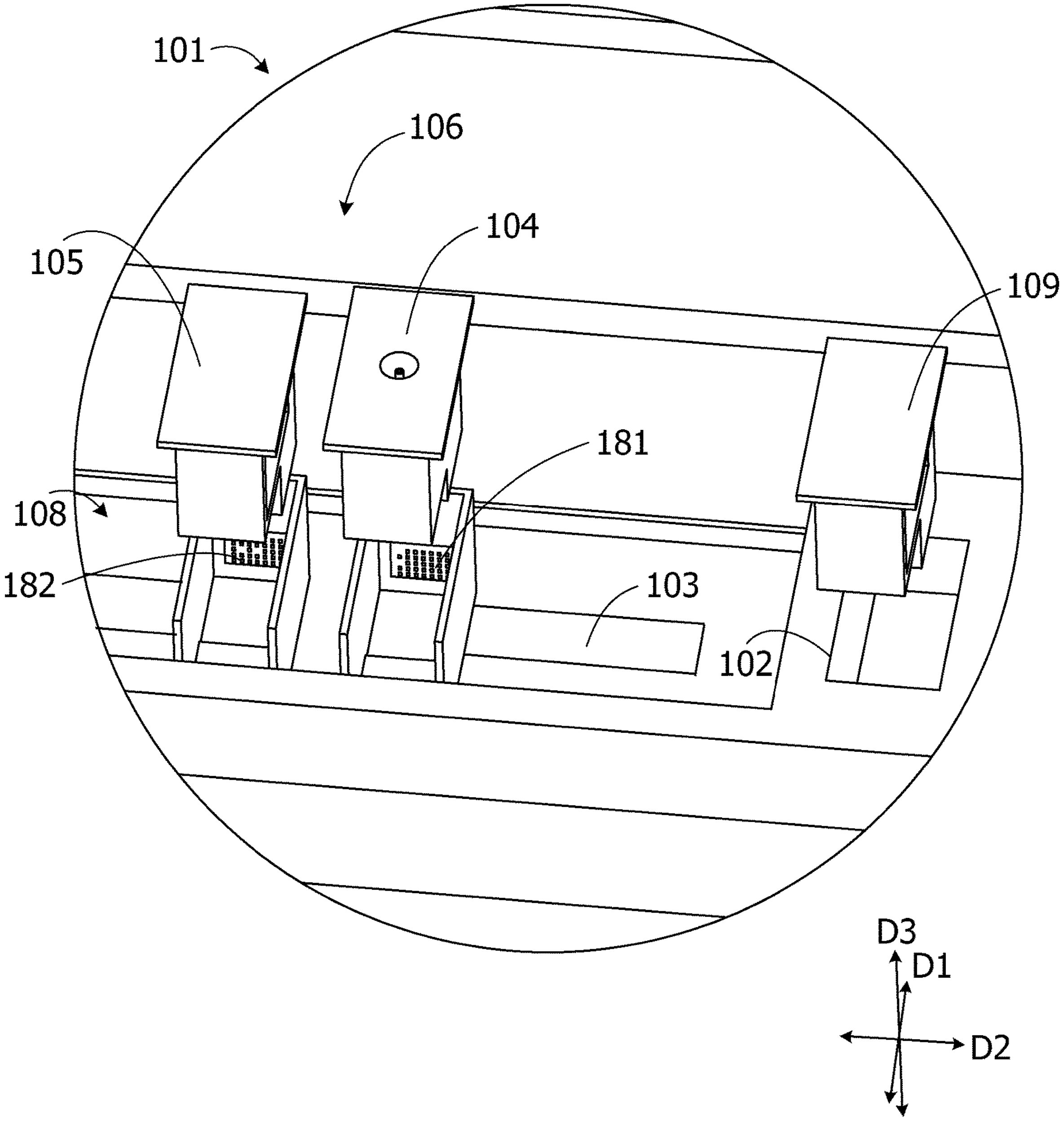
FIG. 2 is a diagram showing internal structure of the inkjet printer according to the first embodiment of the present disclosure after a top cover is opened, and shows a carriage, a first electrical contact, a second electrical contact, and a keeping hollow chamber.

As shown in FIG. 2, the carriage 108 is provided with a recording head 106 to which ink can be replenished many times.

The recording head 106 can reciprocate along with the carriage 108, and the recording head 106 ejects ink toward a recording medium (e.g., a sheet) to record an image (e.g., characters, codes, figures, or the like) on the recording medium.

Specifically, the recording head 106 of the inkjet printer 100 according to the present disclosure includes a first recording head 104, and the inkjet printer 100 includes an electrical contact protection member 105. As shown in FIG. 2, the carriage 108 is provided with a first electrical contact 181 and a second electrical contact 182. The first electrical contact 181 is used to electrically connect with the first recording head 104. The inkjet printer 100 can be used as a monochrome printer when the first recording head 104 contains black ink. In this state, the second electrical contact 182 is exposed. However, in order to prevent adhesion of foreign matter to the second electrical contact 182 and corrosion of the second electrical contact 182 due to the influence of ink mist caused by the exposure of the second electrical contact 182 for a long period of time, the electrical contact protection member 105 is provided.

The electrical contact protection member 105 is mounted on the carriage 108 so as to be in contact with the second electrical contact 182, and is configured to reciprocate together with the carriage 108.

It should be noted that when the first recording head 104 contains black ink, the inkjet printer 100 can perform monochrome recording only when the first recording head 104 and the electrical contact protection member 105 are all correctly mounted on the carriage 108. The first recording head 104 used for ejecting black ink is usually provided inside the printer main body 101, and black ink is supplied to the first recording head 104 from a black ink tank containing black ink via an ink supply pipe.

Specifically, the first recording head 104 is provided with an electrical contact that comes into contact with the first electrical contact 181. In a state in which the first recording head 104 is mounted on the carriage 108, the control module of the inkjet printer 100 can identify that the first electrical contact 181 is in contact with the electrical contact of the first recording head 104, and in this state, operations such as image recording is performed.

Similarly, the electrical contact protection member 105 is provided with an electrical contact that comes into contact with the second electrical contact 182. In a state in which the electrical contact protection member 105 is mounted on the carriage 108, the control module of the inkjet printer 100 can identify that the second electrical contact 182 is in contact with the electrical contact of the electrical contact protection member 105, and in this state, operations such as image recording is performed.

As can be seen in FIG. 4, a shortest distance L1 between the electrical contact protection member 105 mounted on the carriage 108 and the support member 103 in the third direction D3 is greater than a shortest distance L2 between the first recording head 104 mounted on the carriage 108 and the support member 103 in the third direction D3.

The third direction D3 is a direction orthogonal to the first direction D1 and the second direction D2. With this configuration, occurrence of sheet jam sheet jam due to contact between a curved sheet and the electrical contact protection member 105 when the carriage 108 reciprocates in the second direction D2 can be avoided.

It should be noted that, in the present embodiment, a side of the inkjet printer 100 facing a user at a position for using the inkjet printer 100 is defined as "front" and a side opposite thereto is defined as "rear." The first direction D1 is a direction in which the recording medium moves along the front-rear direction in a horizontal posture, and the second direction D2 and the third direction D3 are determined based on the first direction D1.

In another not-shown embodiment, the first direction D1 may be a direction in which the recording medium moves in a vertical posture, whereby the second direction D2 and the third direction D3 are changed according to the direction of the first direction D1.

In the present embodiment, as can be understood from FIG. 4, the shortest distance L1 is a shortest distance in the third direction D3 between a lowest surface of the electrical contact protection member 105 (i.e., a second surface described later) and the support member 103, and the shortest distance L2 is a shortest distance in the third direction D3 between a lowest surface of the first recording head 104 and the support member 103.

A size of the electrical contact protection member 105 in the third direction D3 is designed smaller than a size of the first recording head 104 in the third direction. Furthermore, as shown in FIG. 4, mounting heights of the electrical contact protection member 105 and the first recording head 104 are the same. That is, a top surface of the electrical contact protection member 105 and a top surface of the first recording head 104 are at the same height.

By making the size of the electrical contact protection member 105 in the third direction D3 smaller than the size of the first recording head 104 in the third direction D3, even if the heights of the mounting positions of the electrical contact protection member 105 and the first recording head 104 on the carriage 108 are made the same, the shortest distance L1 can be made greater than the shortest distance L2, and thus manufacturing of the carriage can be simplified.

In other embodiments, the size of the electrical contact protection member in the third direction D3 may be equal to the size of the first recording head in the third direction D3. In this case, the mounting positions (mounting heights) of the first recording head and the electrical contact protection member on the carriage 108 may be adjusted such that the top surface in the third direction D3 of the electrical contact protection member mounted on the carriage 108 becomes higher than the top surface of the first recording head mounted on the carriage 108, so that the shortest distance L1 between the electrical contact protection member mounted on the carriage 108 and the support member 103 in the third direction D3 becomes greater than the shortest distance L2 between the first recording head mounted on the carriage 108 and the support member 103 in the third direction D3.

When the size of the electrical contact protection member in the third direction D3 is made equal to the size of the first recording head in the third direction D3, for example, when the sizes of the electrical contact protection member and the first recording head other than the size along the third direction D3 are also equal, the electrical contact protection member and the first recording head can be manufactured from the same housing (i.e., same mold), which leads to cost reduction. In addition, the space inside the printer body can also be effectively used.

The recording head 106 of the inkjet printer 100 according to the present disclosure further includes a second recording head 109. The second recording head 109 is designed to be detachably attached to the carriage 108, and can be replaced with the electrical contact protection member 105. The second recording head 109 is not the same as the first recording head 104 that ejects black ink, and is, for example, a color recording head that ejects inks of three colors of cyan, magenta, and yellow. In a state in which the second recording head 109 is attached to the carriage 108, an electrical contact of the second recording head 109 contacts the second electrical contact 182 and reciprocates together with the carriage 108.

In a state in which the first recording head 104 and the second recording head 109 are all mounted on the carriage 108, the inkjet printer 100 can be used as a color printer.

The unused second recording head 109 that ejects color inks is normally filled up with color inks, and after the color inks in the second recording head 109 are used up, the second recording head 109 is replaced with a new second recording head 109.

When the inkjet printer 100 is used as a color printer, the electrical contact protection member 105 is removed from the carriage 108 and stored in a keeping hollow chamber. Color printing can be started by mounting the second recording head 109 on the carriage 108 and bring the electrical contact of the second recording head 109 into contact with the second electrical contact 182.

Second Embodiment

An inkjet printer according to a second embodiment of the present disclosure will be described. The inkjet printer of the second embodiment has substantially the same structure as the inkjet printer 100 of the first embodiment described above except for the structure of the electrical contact protection member. Therefore, only the distinguishing features will be described in detail. Members common to those in the first embodiment are denoted by the same reference numerals.

Hereinafter, a structure of an electrical contact protection member 205 according to the second embodiment will be described in detail with reference to FIGS. 5 and 6.

As shown in FIG. 5, the electrical contact protection member 205 includes a first surface 251, and the first surface 251 includes a protection contact 256. In a state in which the electrical contact protection member 205 is mounted on the carriage 108, the protection contact 256 is in contact with the second electrical contact 182. Accordingly, it is possible to prevent adhesion of foreign matter to the second electrical contact 182 and corrosion of the second electrical contact 182 due to the influence of ink mist caused by the exposure of the second electrical contact 182 for a long period of time, and thus it is possible to extend life of the inkjet printer.

The electrical contact protection member 205 includes a second surface 252 and a third surface 253. The second surface 252 is connected to the first surface 251 of the electrical contact protection member 205 and faces the support member 103 in a state in which the electrical contact protection member 205 is mounted on the carriage 108. The third surface 253 is connected to the first surface 251 of the electrical contact protection member 205, and is a surface opposite to the second surface 252. As can be seen in FIG. 5, the second surface 252 is a bottom surface of the electrical contact protection member 205 and the third surface 253 is a top surface of the electrical contact protection member 205.

The electrical contact protection member 205 further includes a fourth surface 254 and a fifth surface 255. The fourth surface 254 intersects with the first surface 251, the second surface 252, and the third surface 253. The fifth surface 255 intersects with the first surface 251, the second surface 252, and the third surface 253, and is a surface opposite to the fourth surface 254. As can be seen in FIG. 5, the fourth surface 254 and the fifth surface 255 are two side surfaces of the electrical contact protection member 205.

At least one of the fourth and fifth surfaces 254 and 255 has an inwardly concave recess 257, and at least a portion of the recess 257 passes through the third surface 253. As shown in FIGS. 5 and 6, the fourth and fifth surfaces 254 and

255 of the electrical contact protection member 205 are respectively provided with the recesses 257 which pass through the third surface 253. As it is clear from the above description, the third surface 253 is a top surface of the electrical contact protection member 205, and in the process of taking the electrical contact protection member 205 out of or into the keeping hollow chamber through a keeping opening 102, since the recesses 257 pass through the third surface 253 to form recessed openings, fingers of a hand of the user can enter the recessed openings and hold the electrical contact protection member 205. With this configuration, the electrical contact protection member 205 can be easily taken out, and the space inside the printer main body 101 can be saved because there is no need to additionally provide a portion for inserting the fingers of the hand into the keeping opening 102. Furthermore, the recessed openings are semicircular and thus the fingers of the hand of the user can fit to the recessed openings.

According to the inkjet printers of the present disclosure, since the shortest distance between the electrical contact protection member mounted on the carriage and the support member in the third direction is longer than the shortest distance between the first recording head mounted on the carriage and the support member in the third direction, the electrical contact protection member is farther from the support member along the third direction than the first recording head and thus is beneficial to avoid sheet jam due to contact between a curved sheet and the electrical contact protection member.

Third Embodiment

An inkjet printer according to a third embodiment of the present disclosure will be described. The inkjet printer of the third embodiment has substantially the same structure as the inkjet printer 100 of the first embodiment except for the relationship between the shortest distance between the electrical contact protection member mounted on the carriage and the support member in the third direction D3 and the shortest distance between the first recording head mounted on the carriage and the support member in the third direction D3. Therefore, only the distinguishing features will be described in detail. Members common to those in the first embodiment are denoted by the same reference numerals.

As can be seen in FIG. 7, a shortest distance L3 between an electrical contact protection member 305 of the third embodiment mounted on the carriage 108 and the support member 103 in the third direction D3 is smaller than a shortest distance L4 between the first recording head 104 mounted on the carriage 108 and the support member 103 in the third direction D3.

By making the electrical contact protection member 305 closer to the support member 103 than the first recording head 104 in the third direction D3, it is possible to reduce the possibility that the nozzle surface of the first recording head 104 is easily damaged by being scraped or rubbed by a curved sheet, and thus it is possible to protect the nozzle surface.

A size of the electrical contact protection member 305 in the third direction D3 is designed larger than the size of the first recording head 104 in the third direction D3. As shown in FIG. 7, mounting heights of the electrical contact protection member 305 and the first recording head 104 are the same. That is, a top surface of the electrical contact protection member 305 and a top surface of the first recording head 104 are at the same height.

By making the size of the electrical contact protection member 105 in the third direction D3 larger than the size of the first recording head 104 in the third direction D3, even if the heights of the mounting positions of the electrical contact protection member 305 and the first recording head 104 on the carriage 108 are made the same, the shortest distance L3 can be made smaller than the shortest distance L4, and thus manufacturing of the carriage can be simplified.

In other embodiments, the size of the electrical contact protection member in the third direction D3 may be equal to the size of the first recording head in the third direction D3. In this case, the mounting positions (mounting heights) of the first recording head and the electrical contact protection member on the carriage 108 may be adjusted such that the top surface in the third direction D3 of the electrical contact protection member mounted on the carriage 108 becomes lower than the top surface of the first recording head mounted on the carriage 108, so that the shortest distance L3 between the electrical contact protection member mounted on the carriage 108 and the support member 103 in the third direction D3 becomes smaller than the shortest distance L4 between the first recording head mounted on the carriage 108 and the support member 103 in the third direction D3.

When the size of the electrical contact protection member in the third direction D3 is made equal to the size of the first recording head in the third direction D3, for example, when the sizes of the electrical contact protection member and the first recording head other than the size along the third direction D3 are also equal, the electrical contact protection member and the first recording head can be manufactured from the same housing (i.e., same mold), which leads to cost reduction. In addition, the space inside the printer body can also be effectively used.

When the inkjet printer 100 is used as a monochrome printer, the electrical contact protection member 305 is normally installed and stored in the keeping hollow chamber of the printer main body 101 by default. The electrical contact protection member 305 is accommodated in the keeping hollow chamber through the keeping opening 102. The first recording head 104 is mounted on the carriage 108 by default, and the electrical contact of the first recording head 104 is in contact with the first electrical contact 181. When the user wants to perform monochrome recording, the user takes the electrical contact protection member 305 out from the keeping hollow chamber and mounts the electrical contact protection member 305 on the carriage 108 so that an electrical contact of the electrical contact protection member 305 comes into contact with the second electrical contact 182.

The structure of the electrical contact protection member 305 of the present embodiment will be described in detail with reference to FIG. 8.

As shown in FIG. 8, the electrical contact protection member 305 includes a first surface 351 and, although not shown, the first surface 351 includes a protection contact similar to the protection contact 256 of the electrical contact protection member 205. In a state in which the electrical contact protection member 305 is mounted on the carriage 108, the protection contact is in contact with the second electrical contact 182. Accordingly, it is possible to prevent adhesion of foreign matter to the second electrical contact 182 and corrosion of the second electrical contact 182 due to the influence of ink mist caused by the exposure of the second electrical contact 182 for a long period of time, and thus it is possible to extend life of the inkjet printer.

The electrical contact protection member 305 includes a second surface 352 and a third surface 353. The second surface 352 is connected to the first surface 351 of the electrical contact protection member 305 and faces the support member 103 in a state in which the electrical contact protection member 305 is mounted on the carriage 108. The third surface 353 is connected to the first surface 351 of the electrical contact protection member and is a surface opposite to the second surface 352. As can be seen in FIG. 8 (showing the electrical contact protection member 305 being inverted from the state shown in FIG. 7), the second surface 352 is a bottom surface of the electrical contact protection member 305, and the third surface 353 is a top surface of the electrical contact protection member 305.

The electrical contact protection member 305 further includes a fourth surface 354 and a fifth surface 355. The fourth surface 354 intersects with the first surface 351, the second surface 352, and the third surface 353. The fifth surface 355 intersects with the first surface 351, the second surface 352, and the third surface 353, and the fifth surface 355 is a surface opposite to the fourth surface 354. As can be seen in FIG. 8, the fourth surface 354 and the fifth surface 355 are two side surfaces of the electrical contact protection member 305.

The electrical contact protection member 305 further includes a sheet jam prevention mechanism disposed along the second direction D2 and forming the second surface. By making the shortest distance L3 between the electrical contact protection member 305 mounted on the carriage 108 and the support member 103 in the third direction D3 (i.e., a distance between the second surface 352 and the support member 103 in the third direction D3) smaller than the shortest distance L4 between the first recording head 104 mounted on the carriage 108 and the support member 103 in the third direction D3, and further forming the second surface 352 with the sheet jam prevention mechanism, it is possible to protect the nozzle surface of the first recording head 104 as the possibility that the nozzle surface of the first recording head 104 is damaged by being scraped or rubbed by a curved sheet is reduced, as well as preventing sheet jam during the reciprocation of the electrical contact protection member 305.

In the present embodiment, the sheet jam prevention mechanism includes a member 358 that is continuous in the second direction D2. The continuous member 358 includes a continuous and uninterrupted plane. That is, the second surface 352 is a continuous and uninterrupted plane. Since the second surface 352 is a continuous and uninterrupted plane, even if a curved sheet comes into contact with the second surface 352 while the electrical contact protection member 305 reciprocates in the second direction D2, the possibility that the sheet is caught by the second surface 352 is reduced, and thus the occurrence of sheet jam can be reduced.

Inkjet printers according to other embodiments described below may have substantially the same structure as the inkjet printer of the third embodiment, except for the structure of the electrical contact protection member. For the sake of brevity, only distinguishing features of the other embodiments will be described in detail, and members common to those in the third embodiment are denoted by the same reference numerals.

Hereinafter, structures of the electrical contact protection members used in the inkjet printers according to the fourth to sixth embodiments of the present disclosure will be described in detail with reference to FIGS. 9 to 11.

Fourth Embodiment

FIG. 9 shows an electrical contact protection member 405 of an inkjet printer according to a fourth embodiment of the present disclosure. Except for the structures of a third surface 453, a fourth surface 454 and a fifth surface 455, the electrical contact protection member 405 of the fourth embodiment may have substantially the same structure as the electrical contact protection member 305 of the third embodiment. To simplify the description, only the distinguishing features will be described in detail.

At least one of the fourth surface 454 and the fifth surface 455 has a recess 457 recessed inward, and at least a portion of the recess 457 passes through the third surface 453.

In the present embodiment, as shown in FIG. 9, the fourth surface 454 and the fifth surface 455 of the electrical contact protection member 405 are respectively provided with the recesses 457, and the recesses 457 penetrate through the third surface 453. As it is apparent from the above description, the third surface 435 is a top surface of the electrical contact protection member 405. In the process of taking the electrical contact protection member 405 out of or into the keeping hollow chamber through the keeping opening 102, since the recesses 457 pass through the third surface 453 to form recessed openings, fingers of a hand of the user can enter the recessed openings and hold the electrical contact protection member 405. With this configuration, the electrical contact protection member 405 can be easily taken out, and the space inside the printer main body 101 can be saved because there is no need to additionally provide a portion for inserting the fingers of the hand into the keeping opening 102. Furthermore, the recessed openings are semicircular and thus the fingers of the hand of the user can fit to the recessed openings.

As shown in FIG. 9, among the first surface 451 and the second surface 452 of the electrical contact protection member 405 of the present embodiment, the first surface 451 is provided with a protection contact 456. in a state in which the electrical contact protection member 405 is mounted on the carriage 108, the protection contact 456 is in contact with the second electrical contact 182. Accordingly, it is possible to prevent adhesion of foreign matter to the second electrical contact 182 and corrosion of the second electrical contact 182 due to the influence of ink mist caused by the exposure of the second electrical contact 182 for a long period of time, and thus it is possible to extend life of the inkjet printer.

Fifth Embodiment

FIG. 10 shows an electrical contact protection member 505 of an inkjet printer according to a fifth embodiment of the present disclosure. Except for the structure of the sheet jam prevention mechanism, the electrical contact protection member 505 of the fifth embodiment may have substantially the same structure as the electrical contact protection member 305 of the third embodiment. To simplify the description, only the distinguishing features will be described in detail.

As shown in FIG. 10, the electrical contact protection member 505 includes a first surface 551, a second surface 552, a third surface 553, a fourth surface 554, and a fifth surface 555. The positional relationship and correlation of these surfaces have been described in detail in the third embodiment, and thus will not be described again.

In the present embodiment, the sheet jam prevention mechanism includes at least three convex ribs 558 spaced apart from each other in the second direction D2. Specifically, as shown in FIG. 10, the number of the convex ribs 558 is six. However, the number of the convex ribs 558 may be set according to actual requirements and may be, for example, three, four, five, or the like. By this sheet jam prevention mechanism, the occurrence of sheet jam can be effectively prevented compared with the protection member described in the background art.

Sixth Embodiment

FIG. 11 shows an electrical contact protection member 605 of an inkjet printer according to a sixth embodiment of the present disclosure. Except for the structure of the sheet jam prevention mechanism, the electrical contact protection member 605 of the sixth embodiment may have substantially the same structure as the electrical contact protection member 505 of the fifth embodiment. To simplify the description, only the distinguishing features will be described in detail.

As shown in FIG. 11, the electrical contact protection member 605 includes a first surface 651, a second surface 652, a third surface 653, a fourth surface 654, and a fifth surface 655. The positional relationship and correlation of these surfaces have been described in detail in the third embodiment, and thus will not be described again.

In the present embodiment, the sheet jam prevention mechanism includes two convex ribs 658 spaced apart from each other in the second direction D2. An interval between the two convex ribs 658 in the second direction D2 is equal to or less than a size of any one of the two convex ribs 658 in the second direction D2. Specifically, when a size of one convex rib 658 in the second direction D2 is denoted by H1 and a size of the other convex rib 658 in the second direction D2 is denoted by H3 as shown in FIG. 11, an interval H2 between the two convex ribs 658 along the second direction D2 is smaller than H1 and H3. As can be understood from the above description, a relationship between H3 and H1 is H3>H1, H3<H1 or H3=H1. By this sheet jam prevention mechanism, the occurrence of sheet jam can be effectively prevented compared with the protection member described in the background art.

According to the inkjet printers of the present disclosure, by making the shortest distance between the electrical contact protection member mounted on the carriage and the support member in the third direction smaller than the shortest distance between the first recording head mounted on the carriage and the support member in the third direction, the electrical contact protection member becomes closer to the support member in the third direction than the first recording head. Therefore, it is possible to reduce the possibility that the nozzle surface of the first recording head 104 is easily damaged by being scraped or rubbed by a curved sheet, and thus it is possible to protect the nozzle surface.

Seventh Embodiment

FIG. 12 shows an electrical contact protection member 705 of an inkjet printer according to a seventh embodiment of the present disclosure. The electrical contact protection member 705 has substantially the same structure as the electrical contact protection member 305 described in detail in the third embodiment. To simplify the description, only the distinguishing features will be described in detail, and members common to those in the third embodiment are denoted by the same reference numerals.

As shown in FIG. 12, the electrical contact protection member 705 includes a first surface 751, a second surface 752, a third surface 753, a fourth surface 754, and a fifth surface 755. The positional relationship and correlation of these surfaces have been described in detail in the third embodiment, and thus will not be described again.

The electrical contact protection member 705 includes the sheet jam prevention mechanism in order to prevent occurrence of sheet jam during reciprocation of the electrical contact protection member 705. the sheet jam prevention mechanism includes a member 758 which forms the second surface 752. The member 758 is continuous in the second direction D2.

The continuous member 758 includes a continuous and uninterrupted curved surface. Specifically, as shown in FIG. 12, the curved surface forms a continuous and uninterrupted convex arc surface which is arc-shaped when viewed from the first direction D1. With this sheet jam prevention mechanism, since the second surface 752 has a shape in which the curved surface is closer to the support member 103 than edges in a moving direction of the electrical contact protection member 705 with respect to the sheet (i.e., edges in the second direction D2), the curved sheet can smoothly pass over the sheet jam prevention mechanism (i.e., the second surface 752). Accordingly, occurrence of sheet jam can be effectively avoided.

Eighth Embodiment

FIG. 13 shows an electrical contact protection member 805 of an inkjet printer according to an eighth embodiment of the present disclosure. Except for the structure of the sheet jam prevention mechanism, the electrical contact protection member 805 of the eighth embodiment may have substantially the same structure as the electrical contact protection members of the third to seventh embodiments. To simplify the description, only the distinguishing features will be described in detail, and members common to those in the third to seventh embodiments are denoted by the same reference numerals.

As shown in FIG. 13, the electrical contact protection member 805 includes a first surface 851, a second surface 852, a third surface 853, a fourth surface 854, and a fifth surface 855. The positional relationship and correlation of these surfaces have been described in detail in the third embodiment, and thus will not be described again.

In the present embodiment, the sheet jam prevention mechanism includes continuous members which form the second surface 852, that is, a plurality of convex rib 858 extending in the second direction D2 and spaced apart from each other in the first direction D1. The plurality of convex rib 858 are connected to the fourth surface 854 and the fifth surface 855, and surfaces of the plurality of convex rib 858 facing the support member 103 are coplanar. As shown in FIG. 13, the number of the convex ribs 858 is six. However, the number of convex ribs 858 may be determined according to actual requirements and may be, for example, three, four, five, etc. The sheet jam prevention mechanism has a smooth shape in the moving direction of the electrical contact protection member 805 relative to the sheet (i.e., in the second direction), and has a small contact area with the sheet and thus has less friction with the sheet. Therefore, the curved sheet can smoothly pass over the sheet jam prevention mechanism (i.e., the second surface 852). Accordingly, occurrence of sheet jam can be effectively avoided compared with the protection member described in the background art.

Ninth Embodiment

FIG. 14 shows an electrical contact protection member 905 of an inkjet printer according to a ninth embodiment of the present disclosure. Except for the structure of the sheet jam prevention mechanism, the electrical contact protection member 905 of the ninth embodiment may have substantially the same structure as the electrical contact protection members of the third to eighth embodiments. To simplify the description, only the distinguishing features will be described in detail.

As shown in FIG. 14, the electrical contact protection member 905 includes a first surface 951, a second surface 952, a third surface 953, a fourth surface 954, and a fifth surface 955. The positional relationship and correlation of these surfaces have been described in detail in the third embodiment, and thus will not be described again.

In the present embodiment, as shown in FIG. 14, the sheet jam prevention mechanism is a continuous mesh-like member which forms the second surface 952. This mesh-like member forms a mesh by a plurality of first convex rib 958' extending in the first direction D1 and spaced apart from each other in the second direction D2 and a plurality of second convex rib 958" extending in the second direction D2 and spaced apart from each other in the first direction D1, the plurality of first convex rib 958' and the plurality of second convex rib 958" intersecting with each other.

To enhance the effect of preventing sheet jam, surfaces of the plurality of first convex rib 958' and the plurality of second convex rib 958" facing the support member 103 may be made coplanar. This sheet jam prevention mechanism has a smooth shape both in the moving direction of the electrical contact protection member 905 with respect to the sheet (i.e., the second direction D2) and in the conveying direction of the sheet (i.e., in the first direction D2), and has a small contact area with the sheet and thus has less friction with the sheet. Therefore, the curved sheet can smoothly pass over the sheet jam prevention mechanism (i.e., the second surface 952). Accordingly, occurrence of sheet jam can be effectively avoided compared with the protection member described in the background art.

Tenth Embodiment

FIG. 15 shows an electrical contact protection member 1005 of an inkjet printer according to a tenth embodiment of the present disclosure. Except for the structure of the second surface 1052, the electrical contact protection member 505 of the tenth embodiment may have substantially the same structure as the electrical contact protection members of the third to ninth embodiments. To simplify the description, only the distinguishing features will be described in detail, and members common to those in the third to ninth embodiments are denoted by the same reference numerals.

As shown in FIG. 15, the electrical contact protection member 1005 includes a first surface 1051, a second surface 1052, a third surface 1053, a fourth surface 1054, and a fifth surface 1055. The positional relationship and correlation of these surfaces have been described in detail in the third embodiment, and thus will not be described again. FIG. 15 shows a protection contact 1056 on the first surface 1051 of the electrical contact protection member 1005 of the present embodiment. In a state in which the electrical contact protection member 1005 is mounted on the carriage 108, the protection contact 1056 is in contact with the second electrical contact 182. Accordingly, it is possible to prevent adhesion of foreign matter to the second electrical contact 182 and corrosion of the second electrical contact 182 due to the influence of ink mist caused by the exposure of the second electrical contact 182 for a long period of time, and thus it is possible to extend life of the inkjet printer.

In the present embodiment, as shown in FIG. 15, a member 1058 of the sheet jam prevention mechanism, forming the second surface 1052 and continuous in the second direction D2, includes a continuous and uninterrupted plane. Further, an arc transition 1060 may be provided to a portion where the plane is connected to the fourth surface 1054, and/or to a portion the plane is connected to the fifth surface 1055. With this sheet jam prevention mechanism, since corners of the second surface 1052 are rounded, the curved sheet can smoothly pass over the electrical contact protection member 1005, and thus the occurrence of sheet jam can be effectively avoided compared with the protection member described in the background art.

Eleventh Embodiment

FIG. 16 shows an electrical contact protection member 1105 of an inkjet printer according to an eleventh embodiment of the present disclosure. Except for the structure of the sheet jam prevention mechanism, the electrical contact protection member 1105 of the eleventh embodiment may have substantially the same structure as the electrical contact protection members of the third to tenth embodiments. To simplify the description, only distinguishing features will be described in detail.

As shown in FIG. 16, the electrical contact protection member 1105 includes a first surface 1151, a second surface 1152, a third surface 1153, a fourth surface 1154, and a fifth surface 1155. The positional relationship and correlation of these surfaces have been described in detail in the third embodiment, and thus will not be described again.

In the present embodiment, as shown in FIG. 16, a member 1158 of the sheet jam prevention mechanism, forming the second surface 1152 and continuous in the second direction D2, includes a continuous and uninterrupted curved surface, and this curved surface is a spherical surface. With this sheet jam prevention mechanism, since the second surface 1152 is a spherical surface, the curved sheet can smoothly pass over the electrical contact protection member 1105, and thus the occurrence of sheet jam can be effectively avoided compared with the protection member described in the background art.

According to the inkjet printer of the present disclosure, by the installation of the electrical contact protection member, the sheet jam prevention mechanism of one of the above embodiments is provided. The sheet jam prevention mechanism is provided along the second direction and forms the second surface facing the support member and connected to the first surface. Therefore, it is possible to avoid occurrence of sheet jam while the carriage reciprocates in the second direction.

Although each technical feature of each embodiment described above can be implemented in any combination, for the sake of simplicity, not all possible combinations of each technical feature in each embodiment described above are described. However, it should be recognized that these combinations are within the scope described herein unless there is a contradiction in the combination of these technical features.

Unless otherwise defined, all technical and scientific terms used herein have the same meaning as commonly understood by one of ordinary skill in the art to which this disclosure belongs. Terms such as "member" appearing in the present description may represent one component or may represent a combination of a plurality of members. Terms such as "installation" appearing in the present description may represent that one member is directly connected to another member, but may represent that one member is connected to another member via an intermediate member.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. An inkjet printer, comprising:

a support member configured to support a recording medium moving in a first direction;

a carriage configured to reciprocate in a second direction orthogonal to the first direction and provided with a first electrical contact and a second electrical contact;

a first recording head mounted on the carriage so as to contact the first electrical contact and configured to reciprocate together with the carriage; and an electrical contact protection member mounted on the carriage so as to contact the second electrical contact and configured to reciprocate together with the carriage, wherein a shortest distance between the electrical contact protection member mounted on the carriage and the support member in a third direction is greater than a shortest distance between the first recording head mounted on the carriage and the support member in the third direction, the third direction being orthogonal to the first direction and the second direction.

2. The inkjet printer according to claim 1, wherein a size of the electrical contact protection member in the third direction is one of smaller than and equal to a size of the first recording head in the third direction.

3. The inkjet printer according to claim 1, wherein the electrical contact protection member comprises a first surface having a protection contact, the protection contact being in contact with the second electrical contact when the electrical contact protection member is mounted on the carriage.

4. The inkjet printer according to claim 3, wherein the electrical contact protection member further comprises:

a second surface connected to the first surface and facing the support member when the electrical contact protection member is mounted on the carriage;

a third surface connected to the first surface and being a surface opposite to the second surface;

a fourth surface intersecting with the first surface, the second surface and the third surface; and a fifth surface intersecting with the first surface, the second surface and the third surface, the fifth surface being a surface opposite to the fourth surface, wherein at least one of the fourth surface and the fifth surface has a recess recessed inwardly, at least a portion of the recess passing through the third surface.

5. The inkjet printer according to claim 1, comprising a second recording head attachable to and detachable from the carriage and replaceable with the electrical contact protection member, wherein the second recording head is in contact with the second electrical contact and configured to reciprocate together with carriage when the second recording head is mounted on the carriage.

* * * * *